United States Patent
Meidanis et al.

[11] Patent Number: 5,984,355
[45] Date of Patent: Nov. 16, 1999

[54] STEERING COLUMN ANGLE

[75] Inventors: Stylianos A. Meidanis, West Bloomfield; Dorinel Neag, Walled Lake; Joseph E. Rudelic, Canton, all of Mich.

[73] Assignee: Chysler Corporation, Auburn Hills, Mich.

[21] Appl. No.: 09/038,188

[22] Filed: Mar. 10, 1998

[51] Int. Cl.[6] ........................................ B62D 1/19
[52] U.S. Cl. .............................. 280/777; 74/493
[58] Field of Search ................................ 280/777, 775, 280/731; 74/493, 492

[56] References Cited

U.S. PATENT DOCUMENTS

| | | |
|---|---|---|
| 3,988,027 | 10/1976 | Serizawa et al. . |
| 4,130,298 | 12/1978 | Shaunnessey . |
| 4,228,695 | 10/1980 | Trevisson et al. . |
| 4,655,475 | 4/1987 | Van Gelderen . |
| 4,738,469 | 4/1988 | Ushijima et al. . |
| 4,895,390 | 1/1990 | Fujikawa et al. . |
| 4,946,195 | 8/1990 | Ioka et al. . |
| 5,346,255 | 9/1994 | Schäfer et al. . |
| 5,507,521 | 4/1996 | Steffens, Jr. ................... 280/775 |
| 5,685,564 | 11/1997 | Iijima et al. . |
| 5,769,454 | 6/1998 | Duval et al. .................. 280/777 |
| 5,769,455 | 6/1998 | Duval et al. .................. 280/777 |

FOREIGN PATENT DOCUMENTS

| | | | |
|---|---|---|---|
| 2408174 | 9/1974 | Germany | 280/777 |
| 3193555 | 8/1991 | Japan | 280/777 |
| 5170111 | 7/1993 | Japan | 280/777 |

*Primary Examiner*—Christopher P. Ellis
*Attorney, Agent, or Firm*—Roland A. Fuller

[57] ABSTRACT

The present invention provides a steering device which has a steering column selectively moveable from a first position to a second position. The first position is a position angled upward conducive to driver use, and the second position is a more horizontal position which is conducive to vehicle crashing. The steering column has a front bracket and a locomotive device. Upon impact, the locomotive device drives the steering column, which rotates about the front bracket, and changes the resulting steering column angle. Thus, when the air bag inflates, it is positioned at a reduced angle and absorbs the impact of the driver more effectively.

11 Claims, 3 Drawing Sheets

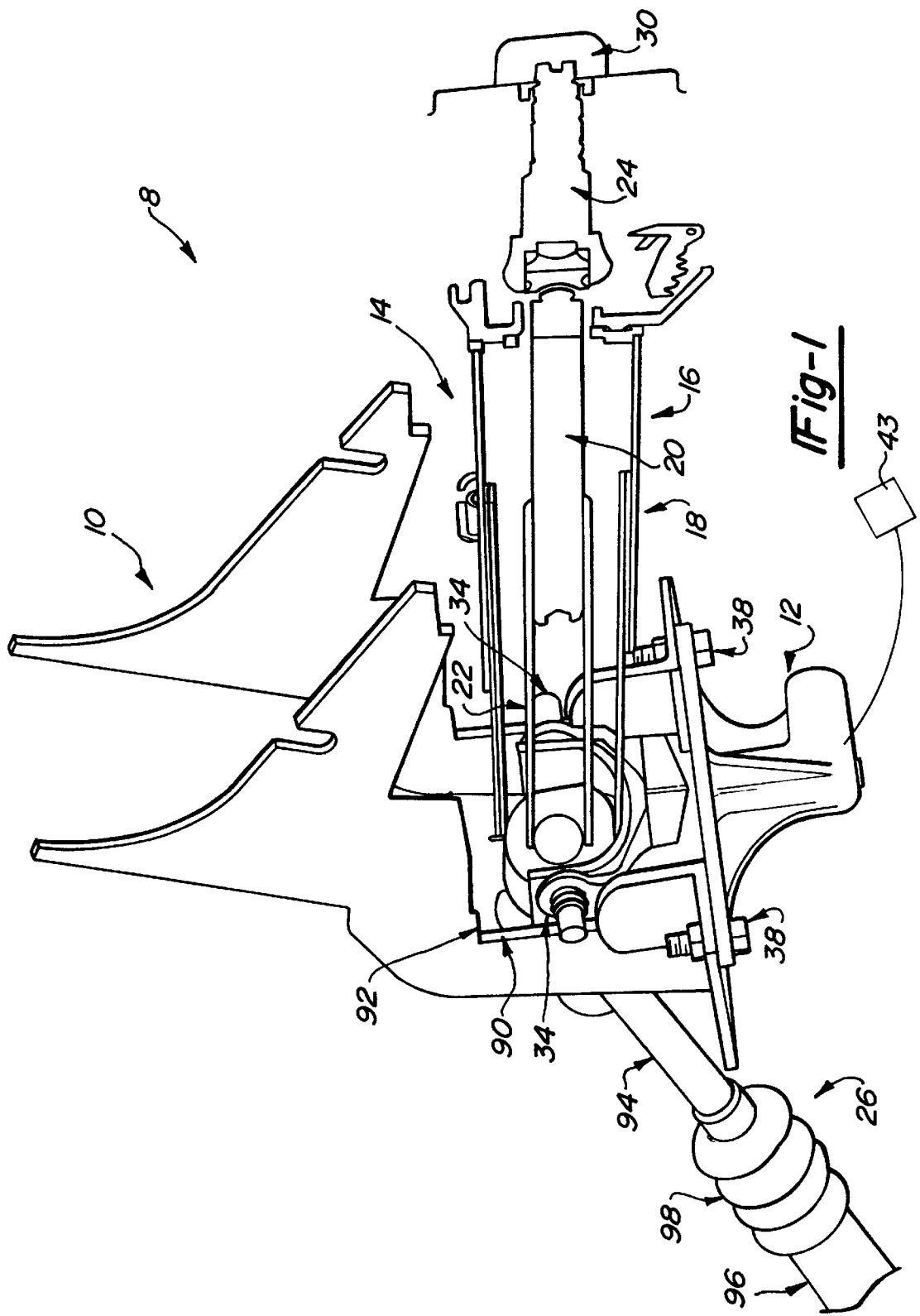

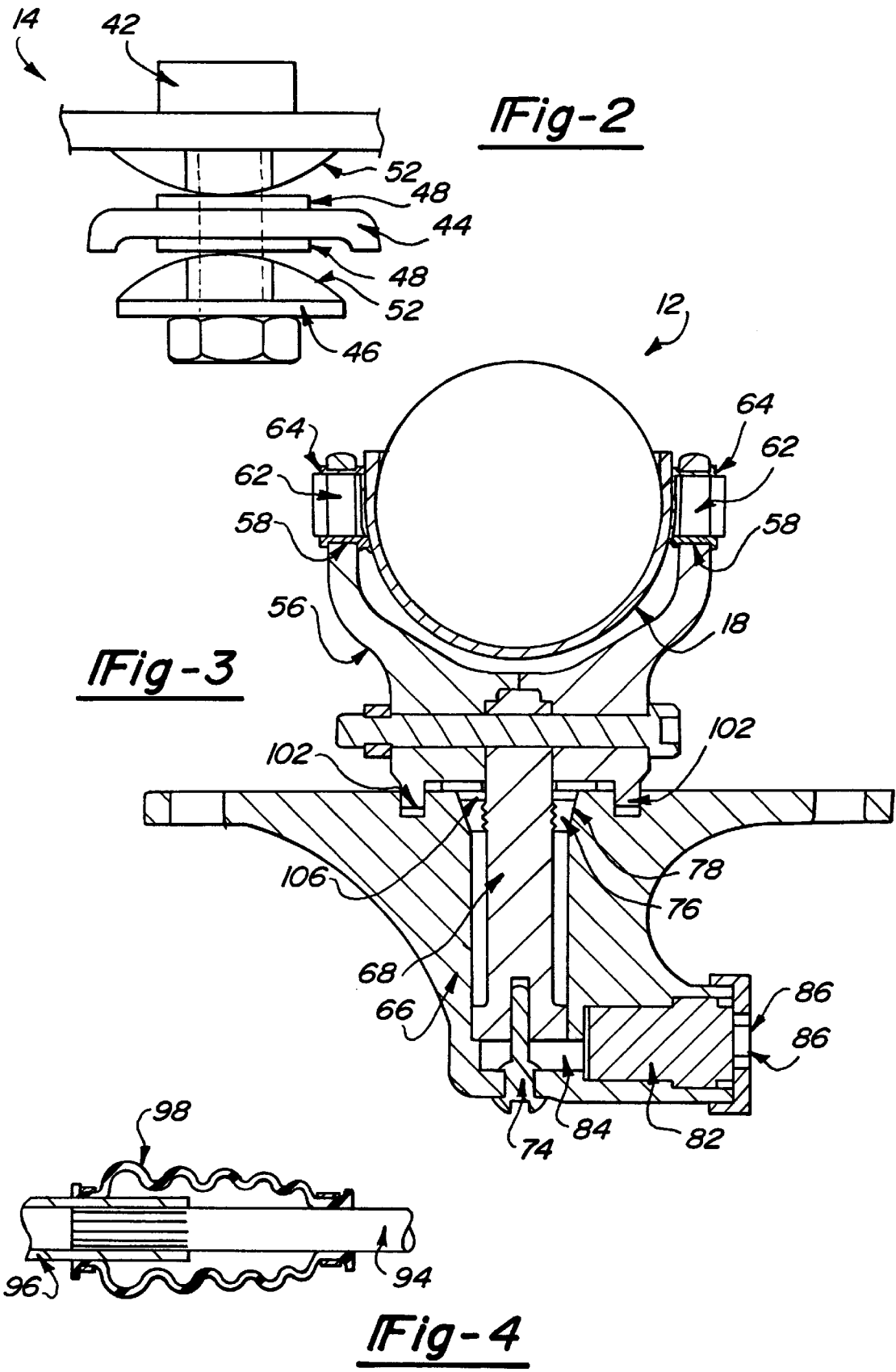

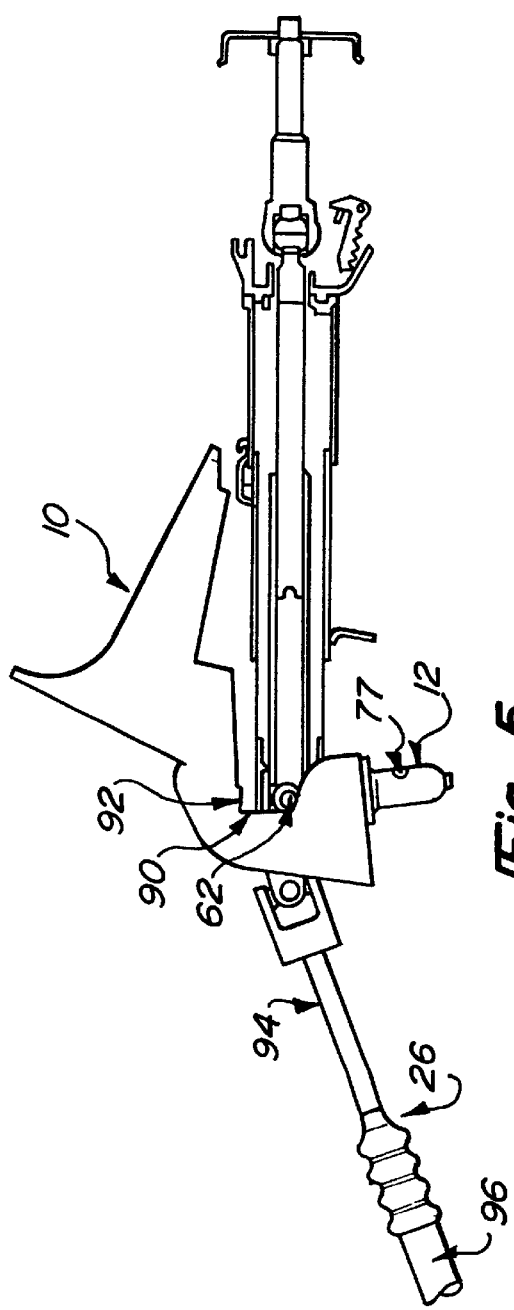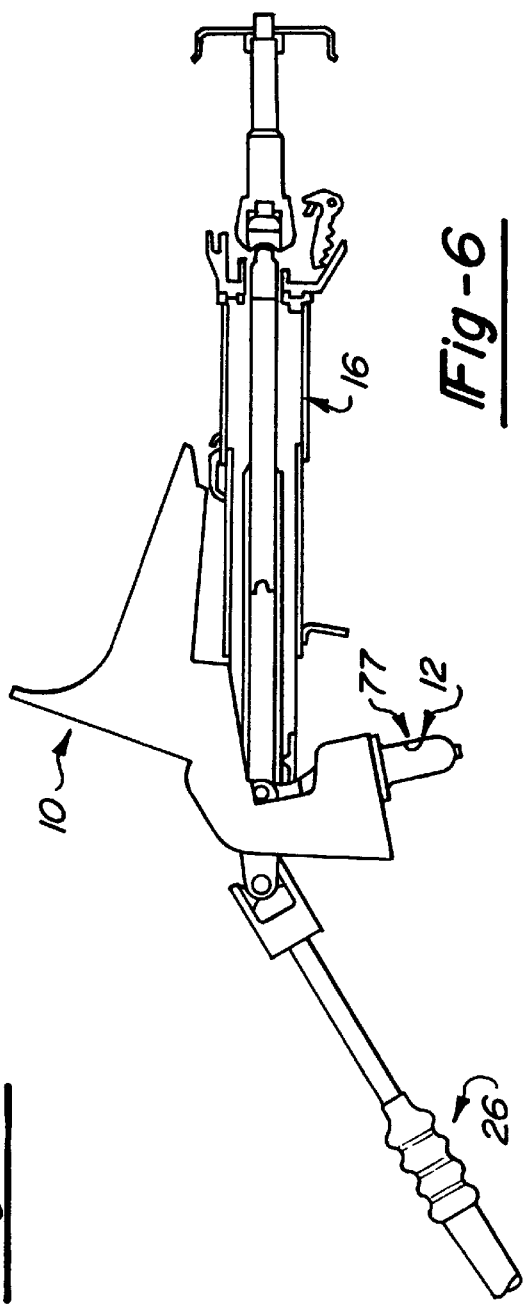

STEERING COLUMN ANGLE

BACKGROUND OF THE INVENTION

I. Technical Field

The present invention relates generally to an apparatus for changing a steering column angle and, more particularly, to an apparatus for changing a steering column angle in response to a sudden impact.

II. Discussion

In the design of vehicles, particularly automobiles, it is desirable that the vehicle be able to undergo a sudden impact and effectively absorb the vehicle driver's momentum. This focus has resulted in the creation of vehicle air bags, improved seat belts, and shoulder harnesses.

In this pursuit, modern vehicles are usually equipped with driver side air bags. When the vehicle undergoes a sudden impact, a vibration sensor inflates the air bag which is located in the steering wheel of the vehicle. The inflated air bag acts to cushion the impact of the vehicle driver, who is moving toward the steering wheel due to the momentum of the impact.

Modern steering columns are angled upward to position the steering wheel such that it faces a driver's head. As a result, when the vehicle undergoes a sudden impact, the inflated air bag cushions the impact of the driver at a position above the driver's torso. This position is above the center of mass of the driver and results in less effective impact absorption than if the air bag was positioned at the driver's torso. However, horizontally positioning the steering column for effective impact absorption creates problems in normal operation of the vehicle. The present invention overcomes these drawbacks.

SUMMARY OF THE INVENTION

The present invention overcomes these drawbacks by providing a steering device which has a steering column selectively moveable from a first position to a second position. The first position is a position angled upward conducive to vehicle operation, and the second position is a more horizontal position which is conducive to effective air bag inflation when the vehicle undergoes a sudden impact. The steering column has a front bracket and a locomotive device. Upon impact, the locomotive device drives the steering column about the front bracket and thus changes the resulting steering column angle. As a result, when the air bag is fully inflated, it is positioned adjacent the vehicle driver by the reduced steering column angle and absorbs the impact of the driver more effectively. In a further aspect of the present invention, the locomotive device can be designed such that it has a locking position, whereby the steering column remains in the second position under the force of impact from the vehicle driver. The locomotive device can also be a bracket, driven by a pyrotechnic charge, which is actuated by an impact sensor indicative of the vehicle crashing. The impact sensor can be a vibration sensor which simultaneously actuates the inflation of the air bag.

Additional advantages and features of the present invention will be apparent from the subsequent description and the appended claims taken in conjunction with the accompanying drawings.

BRIEF DESCRIPTION OF THE DRAWINGS

In the drawings which illustrate the best mode presently contemplated for carrying out the present invention:

FIG. 1 is a perspective view of a steering column angle according to the present invention;

FIG. 2 is a cross-sectional view of a front pivot point of a steering column angle according to the present invention;

FIG. 3 is a cross-sectional view of a locomotive device of a steering column angle according to the present invention;

FIG. 4 is a cross-sectional view of an intermediate shaft of a steering column angle according to the present invention;

FIG. 5 is a cross-sectional view of a steering column angle in a first position according to the present invention; and FIG. 6 is cross-sectional view of a steering column angle in a second position according to the present invention.

DETAILED DESCRIPTION OF THE PREFERRED EMBODIMENTS

With reference to FIGS. 1 through 3, the present invention is now described. In FIG. 1, a steering column angle, generally designated as 8, is shown having steering column support bracket 10, locomotive device 12, front pivot point 14, and steering column 16.

Steering column 16 has cylindrical shell 18 which surrounds front shaft 20 and rear shaft 22. Steering wheel 24 is clamped to front shaft 20. Rear shaft 22 is attached by universal joint or other similar device to an intermediate shaft 26. Front shaft 20 telescopes within rear shaft 22. Upon rotation of steering wheel 24, front shaft 20 rotates which, in turn, rotates rear shaft 22 causing intermediate shaft 26 to rotate. Air bag 30 is affixed to the front of steering wheel 24 and is in electrical connection to a vehicle impact sensor (43). Referring to FIG. 2, pivot point 14 generally comprises nut 42, break point 44, and steering column nut 46. Nut 42 is attached to a rigid surface on the motor vehicle such as steering column support bracket 10 or any other rigid surface. Likewise, steering column nut 46 is attached to a rigid surface such as steering column support bracket 10 or other rigid surface within the motor vehicle. Break point 44 has break away capsules 48 attached to both sides of break point 44. Break away capsules 48 are preferably made of a softer material such as nylon or plastic and are preferably glued or attached to break point 44 by some form of adhesive.

Nut 42 and steering column nut 46 have curved surfaces 52. Curved surfaces 52 are not attached to break away capsules 48 but are instead are in pressing contact with break point 44 to provide sufficient support to steering column 16. As a result, under normal operation, steering column 16 is unable to move about pivot points 34 of locomotive device 12 (See FIG. 1).

As shown in FIG. 1, locomotive device 12 is coupled with steering column 16 by pivot points 34. Also, locomotive device 12 is coupled with the steering column support bracket 10 by bolts 38. Referring to FIG. 3, the "U" shaped bracket 56 of locomotive device 12 has oval holes 58 which fit over bearing surfaces 62. Between bearing surface 62 and holes 58 are bushings 64. Bushings 64 ensure that bearing surfaces 62 are compress fit in holes 58, to provide rigid attachment between locomotive device 12 and steering column 16. Bushings 64 are preferably made of plastic, but also may be made of any material softer than "U" shaped bracket 56 or bearing surface 62 such as rubber or nylon.

Housing 66 encapsulates piston 68 which is attached to "U" shaped bracket 56 by pin 72. Housing 66 is preferably made of cast steel but may be made of any other suitable material and is not limited to the material herein disclosed. Tensile bolt 74 is engaged with housing 66 at one end and threadedly engaged to piston 68 at another. Tensile bolt 74 maintains steering column 16 in a rigid position under normal driving conditions. Tensile bolt 74 is preferably made of a material with a lower strength than piston 68 and housing 66.

Chamfered washer 76 surrounds piston 68 and rests in housing chamfer 78 which is preferably machined into housing 66. Spring 106 presses against chamfered washer 76 thereby biasing chamfered washer 76 into housing chamfer 78. Piston 68 has a gnarled surface (as shown) and is in sliding engagement with the inner surface of chamfered washer 76. Likewise, the inner surface of chamfered washer 76 has a gnarled surface (as shown). Side to side lock system 102, keeps steering column 16 in a side to side rigid position before the vehicle undergoes a sudden impact. This, again, keeps steering column 16 from moving under normal driving operations.

Gas generator 82 is located within housing 66 and is in fluid communication with the bottom portion of piston 68 by channel 84. Channel 84 is preferably substantially airtight. Gas generator 82 is preferably a gunpowder charge with 600 milligrams of gunpowder. It should be noted that gas generator 82 may be any other suitable device for supplying rapid pressure to piston 68 and is not limited to that disclosed herein. Gas generator 82 has plug connector 86 which electrically communicates with the vibration sensor (43) which electronically communicates with air bag 30. However, it is noted that gas generator 82 can communicate with a vibration sensor which is independent of that in communication with air bag 30.

Referring back to FIG. 1, steering column support bracket 10 has cam surfaces 90 and stops 92. Bearing surfaces 62 of locomotive device 12 are in sliding engagement with cam surfaces 90. Steering column support bracket 10 is preferably made of cast steel and is rigidly attached to the interior of a vehicle. Locomotive device 12 is attached to steering column support bracket 10 by bolts 38.

Referring to FIG. 4, intermediate shaft 26 generally comprises input shaft 94, output shaft 96, and boot 98. Input shaft 94 telescopes within output shaft 96. Input shaft 94 is in splined engagement with output shaft 96 which allows input shaft 94 to both telescope within output shaft 96 and rotationally drive output shaft 96. Boot 98 is preferably made of rubber or any other elastic material and flexes to allow input shaft 94 to telescope within output shaft 96.

The operation of the present invention will now be described. In FIG. 5, steering column 16 is shown in a first position. In the first position, locomotive device 12 is in a retracted position as shown. Here, the steering column 16 is preferably between 27 and 29 degrees from horizontal. Upon vehicle impact, a vibration sensor (43) provides an electrical signal to air bag 30 and gas generator 82 (See FIG. 3). The electrical signal provided to air bag 30 initiates the inflation of air bag 30.

Referring to FIG. 3, the electrical signal to gas generator 82 ignites the gunpowder within gas generator 82 causing it to explode and create an increased pressure due to expanding gas in channel 84. The expansion of gas and increase in pressure in channel 84 presses against the lower surface of piston 68, thereby driving piston 68 upward. Tensile bolt 74, designed to maintain steering column 16 in a rigid position under normal driving conditions, breaks allowing piston 68 to travel upward. Likewise, side to side lock system 102, designed to keep steering column 16 in a side to side rigid position under normal driving conditions, becomes free allowing piston 68 to travel upward. The gnarled surface of piston 68 slides against chamfered washer 76 driving it away from housing chamfer 78.

Chamfered washer 76, having gnarled inner surface, is slidingly engaged with piston 68. At the top of the piston stroke of piston 68, excess pressure is released forward, away from occupant, through a vent hole 77 in housing 66. If piston 68 moves in an opposite direction from that just described, the gnarled surface on piston 68 engages the gnarled inner surface of chamfered washer 76, thereby driving, with the aid of spring 108, chamfered washer 76 into housing chamfer 78. This creates a clamping pressure against the walls of piston 68 which prevents piston 68 from moving downward.

Referring back to FIG. 5, while piston 68 moves upward in housing 66, bearing surfaces 62 slide against cam surfaces 90. Likewise, input shaft 94 of intermediate shaft 26 slides away from output shaft 96. This freedom of movement of input shaft 94 allows "U" shaped bracket 56 and thus piston 68 to move upward. Referring to FIG. 2, while piston 68 and "U" shaped bracket 56 travel upward, break point 44 twists clockwise between curved surfaces 52, thereby tearing portions of break away capsule 48 away from break point 44.

Finally, referring to FIG. 6, steering column 16 is shown in a second position where bearing surfaces 62 have reached stops 92 thereby preventing "U" shaped bracket 56 from traveling further. Here, steering column 16 is preferably between 19 and 21 degrees from horizontal. Preferably, air bag 30 has reached its peak inflation and begun absorbing impact of a vehicle driver after bearing surfaces 62 have reached stops 92. At this point, the impact from a vehicle driver due to impact applies force to inflated air bag 30 and thus steering wheel 24. The force from steering wheel 24 drives front shaft 20 into rear shaft 22 thereby tearing break point 44 and break away capsules 48 away from surfaces 52 (See FIG. 2). By this way, steering column 16 is allowed to telescope and absorb the impact of a vehicle driver. Upon this impact, piston 68 in housing 66 will be driven in a direction in reverse of that just discussed by the impact force of the vehicle driver. As a result, the gnarled surface of piston 68 engages the gnarled inner surface of chamfered washer 76, thereby driving chamfered washer 76 into housing chamfer 78 (See FIG. 3). As a result, piston 68 is locked in the second position as shown in FIG. 6.

While the above detailed description described the preferred embodiment of the present invention, it should be understood that the present invention is susceptible to modification, variation, and alteration without deviating from the scope and fair meaning of the subadjoined claims.

What is claimed is:

1. A steering device for steering a motor vehicle, the steering device comprising:

a steering column selectively movable from a first position to a second position;

a front bracket, the steering column pivotally attached to the front bracket;

an impact sensor selectively providing an impact signal indicative of the motor vehicle entering a crash condition;

a locomotive device, the steering column being pivotally connected to the locomotive device; and a steering column support bracket, the steering column support bracket having a cam surface slidingly engaged with a bearing surface of the locomotive device, the cam surface guiding the bearing surface when the steering column moves from the first position to the second position.

2. The steering device as claimed in claim 1, wherein the locomotive device pivots the steering column about the front bracket from the first position to the second position.

3. The steering device as claimed in claim 1, wherein the locomotive device has a lock device, the lock device locking the steering column in the second position when the locomotive device moves the steering column from the first position to the second position.

4. The steering device as claimed in claim 1, wherein the locomotive device has a tensile bolt securing the steering column in the first position such that the steering column has substantially little play, the tensile bolt fracturing when the locomotive device moves the steering column from the first position to the second position.

5. The steering device as claimed in claim 1, wherein the first position is between the ranges of 27 to 29 degrees from horizontal and the second position is between 19 and 21 degrees from the horizontal.

6. The steering device as claimed in claim 1, wherein the locomotive device is driven by a pyrotechnic charge.

7. The steering device as claimed in claim 1, wherein the impact sensor is a vibration sensor used to provide an impact signal to trigger an air bag inflator device.

8. A steering column for a motor vehicle having a first position and a second lower position;

the steering column having a support mechanism holding the steering column in the first position and a pyrotechnic device coupled to the support mechanism and to an air bag deployment system for causing the support mechanism to move the steering column to the second position upon actuation of the pyrotechnic device by the air bag deployment system, the pyrotechnic device including a U-shaped bracket pivotally attached to the steering column, a gas driven piston rigidly attached at a first end to the U-shaped bracket; and a channel fluidly connecting the pyrotechnic device to a second end of the gas driven piston.

9. The steering column as claimed in claim 8, further comprising:

a piston lock, the piston lock being the shape of an angled washer and surrounding the gas driven piston, the gas driven piston having a gnarled surface, whereby the gnarls engage the piston lock in such a way as to allow the gas driven piston to travel in a direction toward the second position and preclude the gas driven piston from traveling in a direction toward the first position.

10. The steering column as claimed in claim 9, further comprising a horizontal lock, the horizontal lock substantially keeping the u-shaped bracket from moving from side to side.

11. The steering column as claimed in claim 9, wherein the U-shaped bracket is pivotally attached to the steering column at at least two bearing surfaces, the U-shaped bracket having at least two passages supporting the two bearing surfaces, each of the bearing surfaces covered by a bushing, the bushing maintaining substantially no movement between the steering column and the u-shaped bracket.

\* \* \* \* \*